US009325638B2

(12) United States Patent
Huerta et al.

(10) Patent No.: US 9,325,638 B2
(45) Date of Patent: Apr. 26, 2016

(54) CONVERSATIONAL ASYNCRONOUS MULTICHANNEL COMMUNICATION THROUGH AN INTER-MODALITY BRIDGE

(75) Inventors: Juan Huerta, Pleasantville, NY (US); David Lubensky, Brookfield, CT (US); David Nahamoo, Great Neck, NY (US)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 12/112,839

(22) Filed: Apr. 30, 2008

(65) Prior Publication Data

US 2009/0276539 A1    Nov. 5, 2009

(51) Int. Cl.
*G06F 15/16* (2006.01)
*H04L 12/931* (2013.01)
*H04L 29/06* (2006.01)
*G06Q 10/06* (2012.01)

(52) U.S. Cl.
CPC .............. *H04L 49/355* (2013.01); *H04L 69/08* (2013.01); *G06Q 10/06* (2013.01)

(58) Field of Classification Search
CPC ..................................................... G06Q 10/06
USPC ................................... 709/227, 230, 238, 249
See application file for complete search history.

(56) References Cited

U.S. PATENT DOCUMENTS

| 6,775,280 | B1 * | 8/2004 | Ma et al. ........................ 370/392 |
| 7,702,792 | B2 | 4/2010 | Shaffer et al. |
| 2003/0235285 | A1 * | 12/2003 | Marsico .............. H04M 3/4228 379/221.13 |
| 2004/0181461 | A1 * | 9/2004 | Raiyani et al. ................... 705/26 |
| 2005/0027888 | A1 * | 2/2005 | Juszkiewicz ................... 709/250 |
| 2005/0198096 | A1 | 9/2005 | Shaffer et al. |
| 2006/0168095 | A1 * | 7/2006 | Sharma et al. ................ 709/217 |
| 2007/0046456 | A1 * | 3/2007 | Edwards ................ G08B 25/14 340/539.1 |
| 2008/0021963 | A1 | 1/2008 | Jana et al. |
| 2009/0080635 | A1 * | 3/2009 | Altberg .................. G06Q 30/02 379/216.01 |

FOREIGN PATENT DOCUMENTS

| CN | 1906605 A | 1/2007 |
| JP | 2004-302850 A | 10/2004 |
| WO | WO 2007/130312 A2 | 11/2007 |
| WO | WO 2007130312 A2 * | 11/2007 |

OTHER PUBLICATIONS

Glaser et al. "Preparation of Deaf end-users and the SoftBridge for semi-automated relay trials." Proceedings of the South African Telecommunications Networks & Applications Conference (SATNAC 2004), 2004.

(Continued)

*Primary Examiner* — Brian J Gillis
*Assistant Examiner* — Michael A Keller
(74) *Attorney, Agent, or Firm* — Daniel P. Morris; McGinn IP Law Group, PLLC

(57) ABSTRACT

A communications apparatus is configured to bridge modalities and different communications formats. The apparatus may include a bridge to receive an input through a modality gateway and to deliver an output through an output channel, a communication engine configured to manipulate the input into the output, a router configured to route the configured output to a respective output channel, and a controller configured to control the bridge. The controller may determine a new modality depending on a context of the communications apparatus.

19 Claims, 4 Drawing Sheets

(56) References Cited

OTHER PUBLICATIONS

International Search Report (PCT Form PCT/ISA/210) dated Sep. 1, 2009.
Chinese Office Action dated Jan. 5, 2013 with partial English translation.
Meryl Glaser, et al., "Preparation of Deaf End-Users and the SoftBridge for Semi-Automated Relay Trials", Proceedings of the South African Telecommunications networks and Applications Conference, 2004.
Japanese Office Action dated Mar. 26, 2013 with partial English translation.
European Search Report dated Oct. 1, 2013.
European Search Report dated May 7, 2014.

* cited by examiner

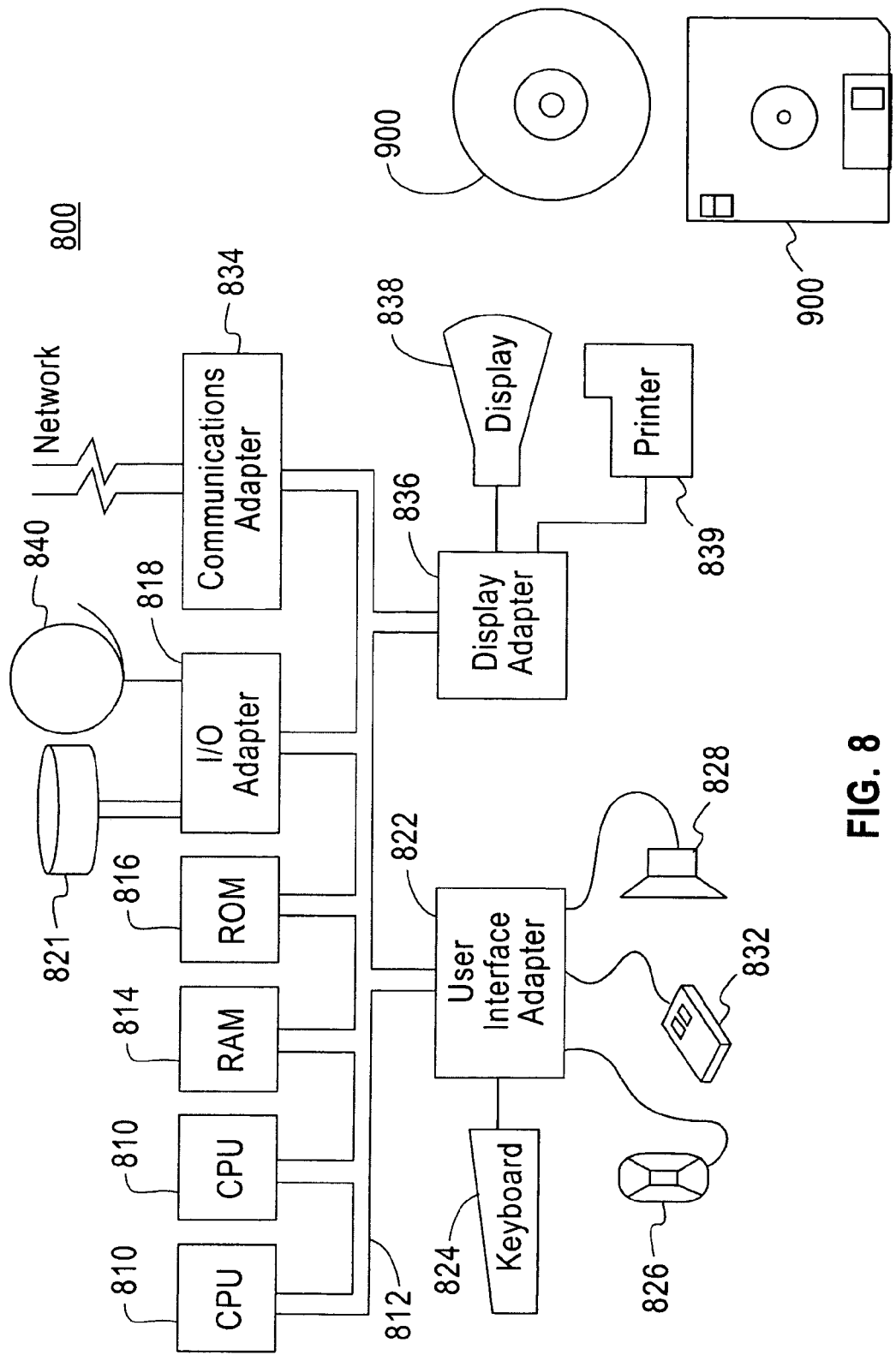

CONVERSATIONAL ASYNCRONOUS MULTICHANNEL COMMUNICATION THROUGH AN INTER-MODALITY BRIDGE

BACKGROUND OF THE INVENTION

1. Field of the Invention

The present invention generally relates to communication systems, and more particularly to a communication transmission system that spans modalities.

2. Description of the Related Art

Modern communications can communicate via a plurality of modalities. Modalities refer to different communication technologies and methods. These technologies may include web chat, short message service (SMS), person to person telephony, facsimile, email, etc, to allow people to communicate with other people in a wide variety of places and formats. Thus, a single communication device may be capable of communicating via a voice modality or an email modality.

The pervasiveness and availability of communication technologies and devices has increased the reliance, demands, and expectations that people have on these technologies. Thus, a person may be able to communicate with others through a mobile device via SMS, email, person to person telephony, and through a web chat application or any other available modality.

Nonetheless, these modalities may not be conducive or available depending on the user's environment and situation. For example, a user may not wish to receive or participate in a person to person telephony modality while participating in a conference or while attending a lecture. On the other hand, a user may not wish to engage in SMS while driving.

Accordingly, the related art lacks the ability for users to communicate with each other through different modalities.

SUMMARY OF THE INVENTION

The invention relates to various methods and systems for communicating across different modalities.

In an exemplary embodiment of the invention, the a communications apparatus includes a bridge configured to receive an input through a modality gateway and to deliver an output through an output channel, at least one communication engine configured to manipulate the input into the output, a router configured to route the configured output to a respective output channel, and a controller configured to control the bridge.

In another exemplary embodiment of the invention, a method of intermodal communications includes determining an output modality, managing a plurality of communication engines to translate the input from a first modality to the output modality, and outputting the output modality to an associated output channel.

BRIEF DESCRIPTION OF THE DRAWINGS

FIG. 8 illustrates a typical hardware configuration of an information handling/computer system according to an exemplary embodiment the invention; and FIG. 9 illustrates a disk storage device configured to store instructions according to an exemplary embodiment of the invention.

DETAILED DESCRIPTION OF EXEMPLARY EMBODIMENTS OF THE INVENTION

Figure 1:
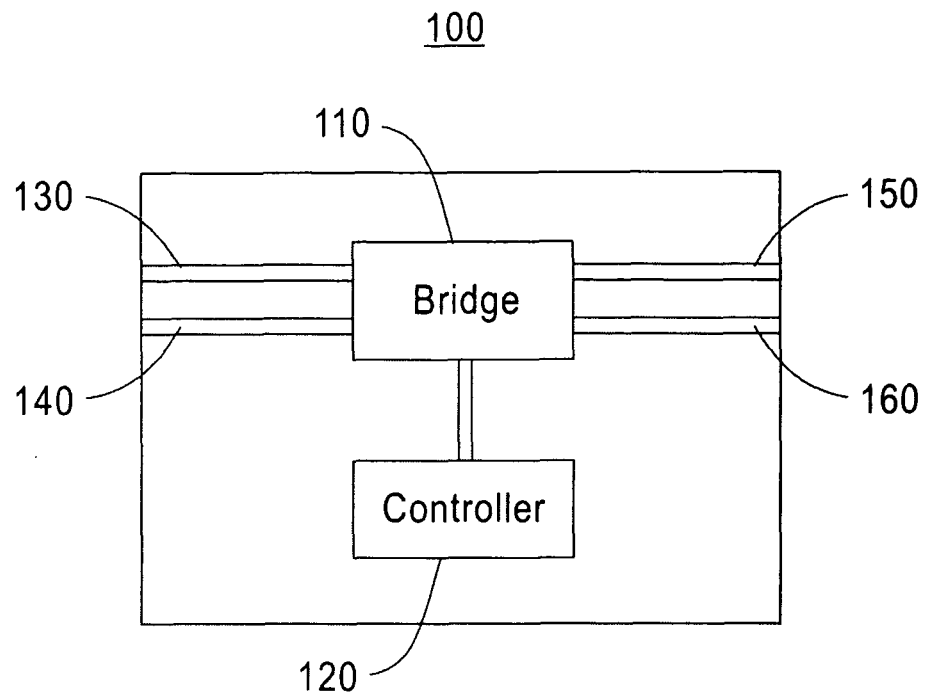
FIG. 1 illustrates an embodiment of a communications device 100 according to an exemplary embodiment of the present invention.

Referring now to the drawings, and more particularly to FIGS. 1-9, there are shown exemplary embodiments of the method and structures according to the present invention.

Exemplary embodiments of the present invention may include a device that includes a modality bridge and a controller. In an exemplary embodiment, a method of providing a bridge across modalities permitting two or more parties to engage in a variety of communications (e.g., asynchronous, synchronous) in the modality that makes most sense for their situation and environment is provided.

Accordingly, it is a first aspect of the invention to provide a method for bridging communication modalities, including the steps of (a) capturing the input (b) converting and manipulating the captured input (c) routing the input into an output channel (d) delivering the output.

In an exemplary embodiment, the bridging method includes a receiving input step in the form of messages, data streams, documents and providing the adequate handlers and containers for such data, additionally placing such data in the adequate processing queues, creating and associating the adequate session, contextual, historical, user-related, or any other relevant information related to the data being processed. This first step is achieved by having a multitude of connections to gateways of the modalities accessed (e.g., SMS gateways, SIP gateways, chat gateways etc) through the implementation of methods that use these gateways respective APIs. Once the data and streams are captured from these gateways, these data needs to be encased in data containers or, in the case of data streams, handlers to the data need to be generated and encased.

In a second step, the bridging method includes managing the engines and annotators which in turn are responsible for performing a series of processing steps on the data including text regularization, spelling correction, named entity extraction, translation, transcription (for the case of voice), text to speech conversion, summarization, search and indexing according to a process sequence described by the controller. This is the proper transition of modality and to achieve it the bridge leverages a collection of annotators, transcription and analysis engines.

These annotators can be local or remote to the system and can be accessed through communication protocols including for example Web Services etc. Additionally, queues and information management frameworks (e.g., MQSeries and UIMA, for example) could be of use in handling this data analysis and processing.

In a third step, the bridging method includes routing of the processed data into the pertinent output channel queues. Thus step includes the prioritization and monitoring of the Quality of Service parameters (e.g., latencies etc).

In a fourth step, the bridging method includes delivery of the output data in the form of document, message, stream, etc to the adequate channel (e.g., telephone conversation, chat conversation, SMS number, email address, fax number etc). To achieve this step, the bridge needs to have access to a plurality of communication channels and modalities and needs to be able to control the placement of outbound messages and streams.

FIG. 1 illustrates an embodiment of a communications system according to an exemplary embodiment of the present invention. Referring to FIG. 1, an embodiment of the present invention may include communications device 100. In an emblematic embodiment, communications device 100 can be configured to bridge various communication modalities. Communications device 100 may include controller 120 associated with bridge 110. Controller 120 can be configured to control an operation of bridge 110. In addition, bridge 110 may be configured to receive communication inputs through modality inputs 130 and 140 and to output a communication output through outputs channels 150 and 160. Depending on the embodiment, bridge 110 may receive and output any number of inputs and outputs.

In an emblematic embodiment, the inputs may include any form of communication data and communication modality. These communication modalities may include, for example, SMS, data streams, documents, voice transmissions, photos, facsimiles, emails, and video. Thus, in an exemplary embodiment, modality input 130 may be a voice input channel. Additionally, modality input 140 may be an SMS input channel. Nonetheless, communication devices according to the present invention may include any numbers and variety of modality inputs.

Similarly, the output channels may preferably include any form of communication data and communication modality. These communication modalities may include, for example, SMS, data streams, documents, voice transmissions, photos, facsimiles, emails, and video. Thus, output channel 150 may be a voice input channel. Additionally, output channel 160 may be an SMS input channel. Nonetheless, communication devices according to the present invention may include any numbers and variety of output channels.

In an exemplary embodiment, controller 120 may be configured to control bridge 110. In additional embodiments, controller 120 may also be configured to control additional features related to bridge 110 and communications device 100. In other exemplary embodiments, bridge 110 may be configured to perform the functions of a controller.

In an exemplary embodiment, controller 120 may be configured to determine an appropriate modality for a communication. In an emblematic embodiment, controller 120 can determine an optimum output communication and an optimum communication channel. In addition, controller 120 may determine a modality of a received input and whether the input's modality should be modified. For example, controller 120 may determine that voice communications are not appropriate or optimal and determine to output a non-audio output when an audio input is received. Additionally, a user may direct controller 120 to output a predetermined modality. For example, a user may elect to receive only an SMS output.

In an exemplary embodiment, controller 120 may be configured to route the communications to an appropriate output channel. For example, voice data may be sent to an appropriate phone line. In other examples, controller 120 may select an email address.

In an exemplary embodiment, controller 120 may control the configuration of the cross-channel communications or bridge 110. Thus, controller 120 may determine that an incoming format should be changed. In an exemplary embodiment, incoming text may be modified according to user preferences. For example, controller 120 may determine that text output be an Arial font instead of Times New Roman.

Figure 2:
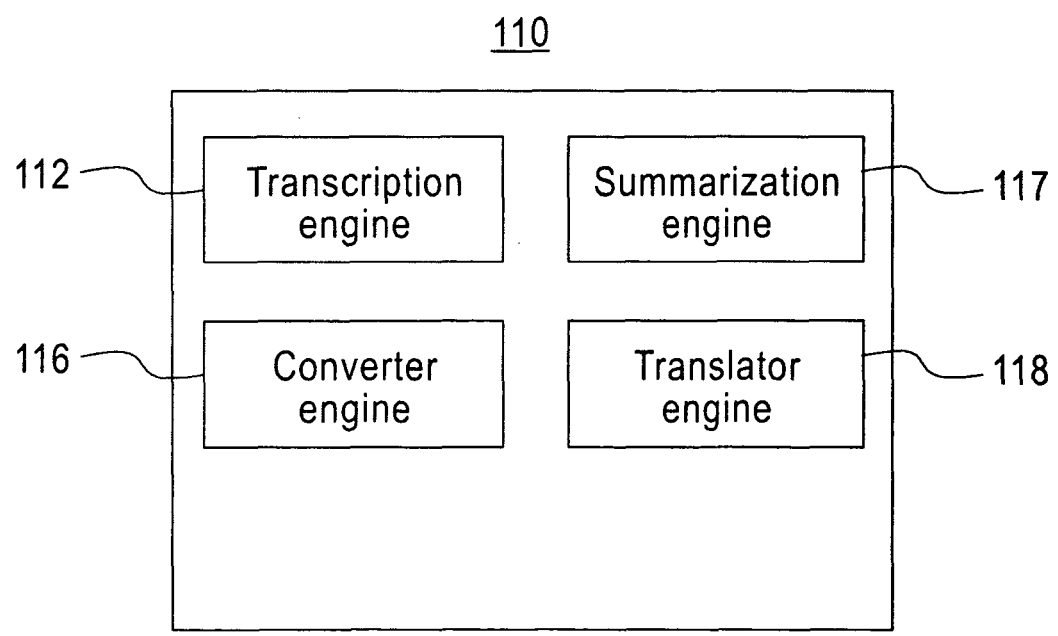
FIG. 2 illustrates an embodiment of a bridge according the embodiment of FIG. 1.

FIG. 2 illustrates an embodiment of bridge 110 according to an embodiment of the present invention. Referring to FIG. 2, bridge 110 may include at least one of transcription engine 112, summarization engine 114, converter engine 116, and translator engine 118. Bridge 110 may include other modality engines configured to shape or alter a modality of communication.

For example, in an emblematic embodiment, a modality engine may include an engine to perform additional regularization steps on the input. The regularization can include text regularization, spell checking, name extraction.

In additional embodiments, transcription engine can be configured to convert incoming voice messages or data into text data. Thus, for example, a voice mail message could be converted into an electronic document. In other embodiments, the voice data may be converted into a text SMS message.

In an exemplary embodiment, summarization engine 114 may be configured to summarize voice or typed data into smaller bullet points. Summarization functions are well known to those skilled in the art.

In an exemplary embodiment, converter engine 116 may be configured to convert text data into speech or other audio data. Converter functions are well known to those skilled in the art.

In an exemplary embodiment, translator engine 118 may be configured to convert voice data from one language to another. Translator functions are well known to those skilled in the art.

In an emblematic embodiment, bridge 110 may include router 170. Router 170 may configured to route the manipulated input to an appropriate output channel. For example, router 170 may direct a voice output from translator engine 118 to an audio communications output or a test based output to an SMS output channel.

While FIG. 2 illustrates an embodiment in which transcription engine 112, summarization engine 114, converter engine 116, and translator engine 118 can be provided locally in bridge 110, additional embodiments of communications device 100 can access remote engines. For example, if controller 120 determines that an incoming input requires a modification or regularization engine not provided in bridge 110, controller 120 may access the desired engine through any known communication protocol. For example, communication protocols such as Web Services, MQSeries and UIMA may be accessed.

Figure 3:
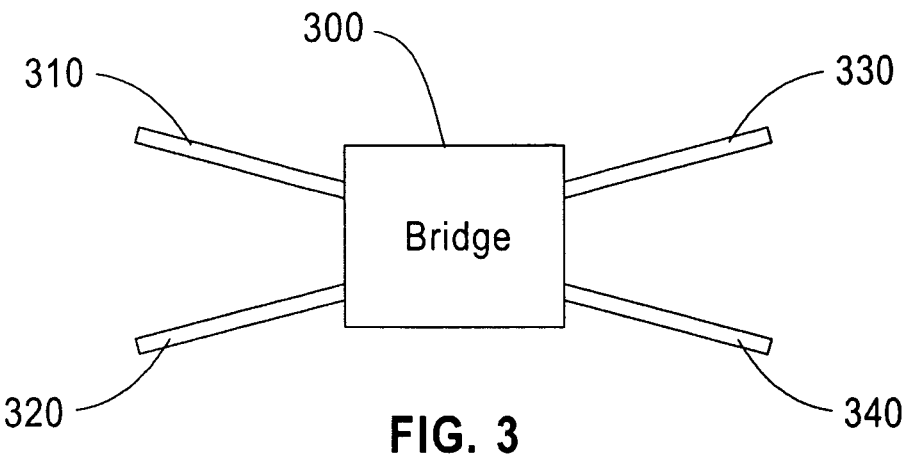
FIG. 3 illustrates an embodiment of a hub and spoke arrangement according to one exemplary embodiment of the present invention.

FIG. 3 illustrates an embodiment of a hub and spoke arrangement according one embodiment of the present invention. Referring to FIG. 3, bridge 300, first input channel 310, second input channel, 320, first output channel 330, and second output channel 340 can be arranged in a "Hub and Spoke" fashion. That is, in an exemplary embodiment, the channels are ultimately connected through the bridge wherein the bridge acts as a hub connecting the spokes.

Figure 4:
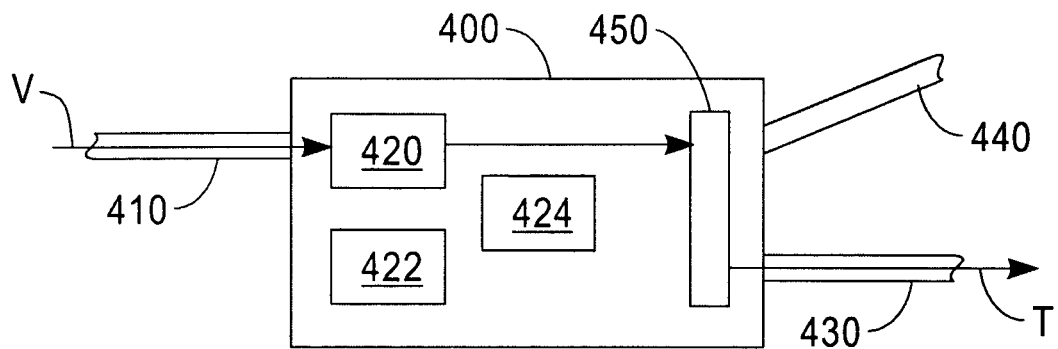
FIG. 4 illustrates an operation of a hub and spoke arrangement of FIG. 3 according to an exemplary embodiment of the present invention.

FIG. 4 illustrates an embodiment of an operation of the hub and spoke arrangement of FIG. 3 according to an embodiment of the present invention. Referring to FIG. 4, bridge 400 is associated with voice input channel 410, voice output channel 440, and text output channel 430. Bridge 400 may also include various modality engines. In an exemplary embodiment, bridge 400 may include transcription engine 420, voice to voice translator engine 422, and voice to voice summarization engine 424. Router 440 may be configured to direct an output from any engine included in bridge 400 to an appropriate output channel. These engines would typically be software modules.

In FIG. 4, one embodiment of an operation of a Hub and Spoke arrangement is illustrated as bridge 400 receives voice input V through voice input channel 410. In this example, bridge 400 has determined that a text output is appropriate. Accordingly, bridge 400 directs the voice data input into transcription engine 420. Text output T from transcription engine 420 is then directed to text output channel 430 by router 440.

In an exemplary embodiment, a controller may be employed to determine the engine that bridge 400 employs. The controller may also be used to determine which channel the input and output are directed to and from.

Figure 5:
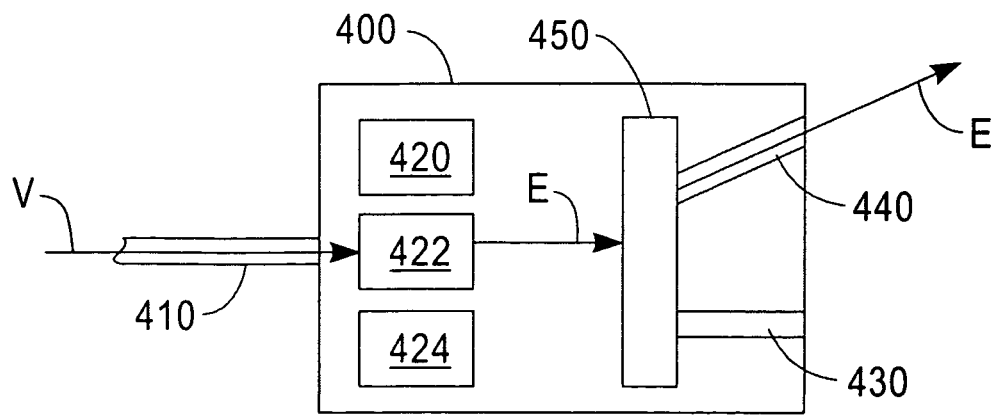
FIG. 5 illustrates another exemplary embodiment of the hub and spoke arrangement of FIG. 3 according to the embodiment of FIG. 4.

FIG. 5 illustrates another embodiment of the hub and spoke arrangement according to the embodiment of FIG. 4. Referring to FIG. 5, bridge 400 again receives voice input V through voice input channel 410. In the present example, however, bridge 400 has determined that voice input V should be translated. Accordingly, bridge 400 routes the voice input V to voice to voice translator engine 422. Next, router 440 outputs translated voice data E through voice output channel 440.

Figure 6:
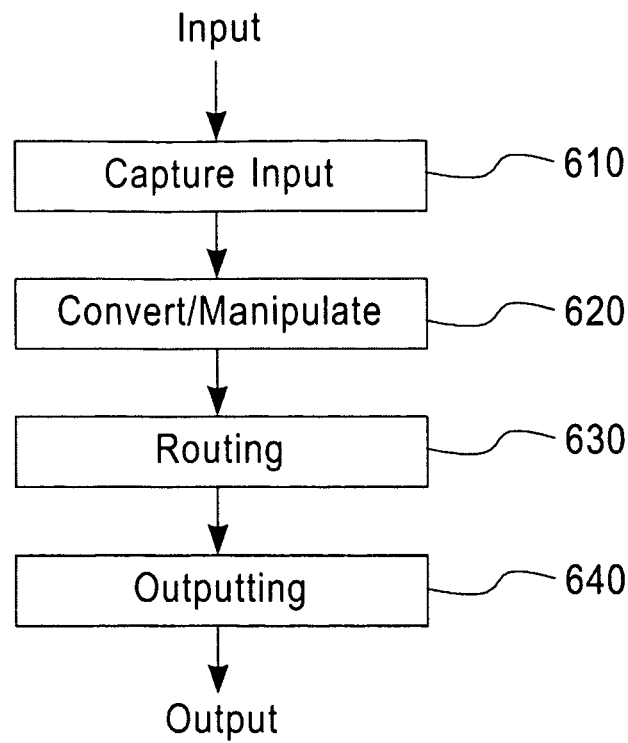
FIG. 6 illustrates an exemplary embodiment of a method according to an embodiment of the present invention.

FIG. 6 illustrates an embodiment of a method according to an embodiment of the present invention.

To further explain the invention, a method for controlling the bridge described above is provided. The method for controlling the bridge would include the steps of (a) determining the data processing sequence (b) determining and managing the input channels (c) determining and managing the output channels (d) handling contextual information and persisting the data.

In an exemplary embodiment, the controller method includes the first step of determining the data processing sequence including the order and type of processing (e.g., transcription and summarization, or summarization and text to speech generation). This is achieved by the use of configuration files that describe user preferences. This configuration files can be modified by users through web interfaces and applications.

In an exemplary embodiment, the second responsibility and step of the controller consist of the ability of handling and managing the input channels including the opening and closing of sessions (e.g., phone calls), receiving emails, SMS's etc.

In an exemplary embodiment, the third responsibility of the controller consists of handling and managing the output channels including the opening and closing of session, for example placing phone calls, sending emails, sending SMS's, sending Instant Messaging text, etc.

In an exemplary embodiment, the fourth responsibility of the controller includes persisting the data, and maintaining all the contextual information that is necessary for the processing engines to work.

Referring to FIG. 6, embodiments of a method to carry out the present invention may include the steps of, first, capturing an input 610. Upon capturing the input, the next step may be converting and manipulating the captured input 620. The next step may include routing 630 the converted and manipulated input into an output channel. The next and final step may include delivering an output 640 to a user.

In one embodiment of the present invention, the bridging method includes receiving input 610 in the form of messages, data streams, documents and providing the adequate handlers and containers for such data, additionally placing such data in the adequate processing queues, creating and associating the adequate session, contextual, historical, user-related, or any other relevant information related to the data being processed. This first step is achieved by having a multitude of connections to gateways of the modalities accessed (e.g., SMS gateways, SIP gateways, chat gateways etc) through the implementation of methods that use these gateways respective advanced programming interfaces (APIs).

In an embodiment of the present invention, the bridging method includes converting and manipulating the captured input 620. The converting steps can include translating modalities. For example, a text SMS may be translated into voice. The manipulating steps may include a series of processing steps on the data including text regularization, spelling correction, named entity extraction, translation, transcription (for the case of voice), summarization, search and indexing.

In an embodiment of the present invention, the bridging method includes routing the converted and manipulated input to an output channel 630. The routing of the converted and manipulated input may include prioritizing the output according to a quality of service parameter. In addition, the routing of the converted and manipulated input may include monitoring the output according to a quality of service parameter In an embodiment of the present invention, the bridging method includes delivering an output 640.

Figure 7:
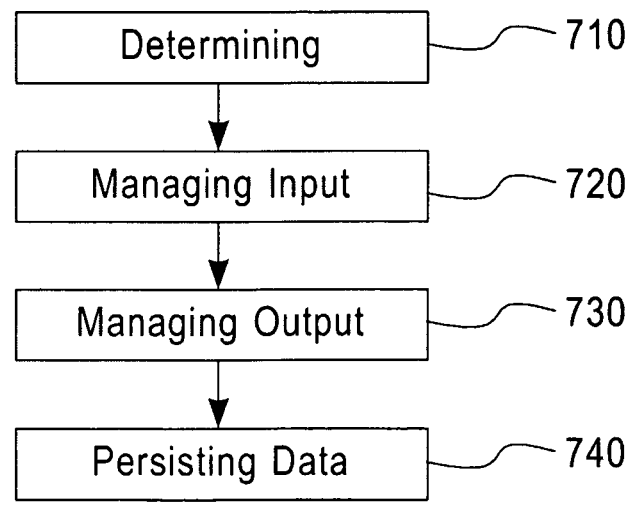
FIG. 7 illustrates an exemplary embodiment of a method of controlling a controller according to the present invention.

FIG. 7 illustrates another exemplary embodiment of a method of controlling controller 120 according to the present invention. Referring to FIG. 7, the method for controlling bridge 110 may include the steps of determining the data processing sequence 710, determining and managing the input channels 720, determining and managing the output channels 730, and handling contextual information and persisting the data 740.

In one embodiment, determining the data processing sequence 710 may include the order and type of processing (e.g., transcription and summarization, or summarization and text to speech generation). This is achieved by the use of configuration files that describe user preferences. This configuration files can be modified by users through web interfaces and applications.

In one embodiment, determining and managing the input channels 720 may include handling and managing the input channels including the opening and closing of sessions (e.g., phone calls), receiving emails, SMS's etc.

In one embodiment, handling and managing the output channels 730 may include the opening and closing of session, for example placing phone calls, sending emails, sending SMS's, sending Instant Messaging text, etc In one embodiment, persisting the data 740 may include maintaining all the contextual information that is necessary for the processing engines to work.

FIG. 8 illustrates a typical hardware configuration of an information handling/computer system in accordance with the invention and which preferably has at least one processor or central processing unit (CPU) 811.

The CPUs 811 are interconnected via a system bus 812 to a random access memory (RAM) 814, read-only memory (ROM) 816, input/output (I/O) adapter 1118 (for connecting peripheral devices such as disk units 821 and tape drives 840 to the bus 1112), user interface adapter 822 (for connecting a keyboard 824, mouse 826, speaker 828, microphone 832, and/or other user interface device to the bus 812), a communication adapter 834 for connecting an information handling system to a data processing network, the Internet, an Intranet, a personal area network (PAN), etc., and a display adapter 836 for connecting the bus 812 to a display device 838 and/or printer 839 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 811 and hardware above, to perform the method of the invention.

This signal-bearing media may include, for example, a RAM contained within the CPU 811, as represented by the fast-access storage for example. Alternatively, the instructions may be contained in another signal-bearing media, such as a magnetic data storage diskette 900 (FIG. 9), directly or indirectly accessible by the CPU 811.

Whether contained in the diskette 900, the computer/CPU 811, or elsewhere, the instructions may be stored on a variety of machine-readable (e.g., computer-readable) data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), or paper "punch" cards.

Alternatively, other suitable signal-bearing media may include transmission media such as digital and analog and communication links and wireless.

In an illustrative embodiment of the invention, the machine-readable (e.g., computer-readable) instructions may comprise software object code.

While this invention has been described in connection with certain exemplary embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims.

Further, it is the inventor's intent to retain all equivalents of the claimed invention even if the claims are amended during prosecution.

What is claimed is:

1. A communications apparatus, comprising:
   a bridge, as performed on a processor in a computer, said bridge being configured to receive an input through a modality gateway and to deliver an output through an output channel, the bridge being configured to determine an appropriate communication engine to apply to the input;
   at least one communication engine configured to translate the input into the output,
   wherein the bridge is configured to associate contextual data with the input being manipulated; and
   a router configured to route the output to a respective output channel,
   wherein the bridge through the router routes processed data into output channel queues including prioritization and monitoring of Quality of Service.

2. The communications apparatus of claim 1, further comprising:
   a router configured to route the output to a respective output channel; and
   a controller, separate from the bridge, configured to control the bridge, the controller configured to determine which channel the input and output are directed to and from according to the modality of communication.

3. The communications apparatus of claim 2, wherein the bridge provides a plurality of connections to a plurality of gateways in a plurality of different modalities,
   wherein the controller manages the communication engines and annotators which process data including processing for the plurality of different modalities according to a process sequence described by the controller, the annotators being local or remote and accessed through communication protocols,
   wherein the bridge through the router routes the processed data into output channel queues including prioritization and monitoring of the Quality of Service, and
   wherein the bridge delivers the output by having access to a plurality of communication channels and modalities and control a placement of outbound messages and streams.

4. The communications apparatus of claim 1, wherein the bridge comprises configuration files that define a user preference.

5. The communications apparatus of claim 1, wherein the bridge is configured to determine a contextual scenario for a received input, and
   wherein the bridge determines an output format according to the determined contextual scenario.

6. The communications apparatus of claim 1, wherein the bridge is configured to manage a plurality of modality gateways,
   wherein the bridge accesses a plurality of the output channels and a plurality of modalities and controls a placement of outbound messages and streams to the plurality of the output channels having different modalities of communication, and
   wherein the plurality of output channels include data stream, document, voice transmission, photos, facsimile, electronic mail, and video output channels.

7. The communications apparatus of claim 1, wherein the bridge is configured to manage a plurality of output channels, and
   wherein each one of the output channels being a different modality of communication.

8. The communications apparatus of claim 1, wherein the bridge is configured to persist contextual information required by the communication engines.

9. The communications apparatus of claim 1, wherein the bridge is configured to receive the input and encase the input in data containers, and
   wherein the bridge is configured to route the encased data to a predetermined communication engine.

10. The communications apparatus of claim 1, wherein the bridge is configured to determine a data processing sequence to be applied to an input communication modality, determining and managing a plurality of input channels, determining and managing a plurality of the output channels, and handling the contextual data and persisting operational data, wherein the bridge is configured to manage a plurality of the modality gateways external from the bridge through a plurality of connections, wherein the bridge further comprises:
a plurality of modality engines configured to shape or alter a modality of communication; and
a router configured to route the output to respective one of the plurality of the output channels, the modality engines including:
a transcription engine configured to convert incoming voice messages or data into text data;
a converter engine configured to convert text data into speech or other audio data;
a summarization engine configured to summarize voice or typed data; and
translator engine configured to convert voice data from one language to another.

11. A method of intermodal communications, the method comprising:
receiving an input having a first modality;
determining an output modality;
managing a plurality of communication engines to translate the input from the first modality to the output modality;
associating contextual data with the input being manipulated;
outputting the output modality to an associated output channel;
managing an input channel;
routing the output to the output channel; and
processing data into output channel queues including prioritization and monitoring of Quality of Service.

12. The method of claim 11, further comprising persisting operational data.

13. The method of claim 11, wherein the managing of the input comprises connecting to a remote communications engine.

14. The method of claim 11, further comprising routing the output modality to a predetermined output queue.

15. The method of claim 14, wherein the routing comprises prioritization of a quality of service parameters.

16. The communications method of claim 15, wherein the routing comprises monitoring the output according to said quality of said service parameters.

17. The method of claim 14, wherein the routing comprises monitoring of a quality of service parameters.

18. The method of claim 11, further comprising determining a data processing sequence to be applied to an input communication modality.

19. A non-transitory computer-readable storage medium tangibly encoded with a program of machine-readable instructions executable by a digital processing apparatus to perform a computerized method of claim 11.

* * * * *